UNITED STATES PATENT OFFICE.

ISAAC WOOLWORTH, OF NEW HAVEN, CONNECTICUT.

IMPROVEMENT IN THE MANUFACTURE OF RUBBER FOR DENTAL PURPOSES.

Specification forming part of Letters Patent No. 51,642, dated December 19, 1865.

*To all whom it may concern:*

Be it known that I, ISAAC WOOLWORTH, of New Haven, in the county of New Haven and State of Connecticut, have invented a new and useful Improvement in the Preparations of India-Rubber for Dental Purposes, and I do hereby declare the following to be a full, clear, and exact description of the same.

My invention is designed to give to hard rubber, such as is used for dental purposes, a more natural appearance than has heretofore been attained; and it consists in mingling two or more tints, as "English pink" and "American red," so that the two colors when vulcanized and finished will have a striated or veiney appearance, imitating in the most perfect manner the natural gum.

Heretofore the American red or English pink rubbers have been used separately according to the taste of the dentist, or as the occasion required, and although either serves a very good purpose, they lack the veiney, fleshy appearance and color of the natural gum—an object long desired, and which is fully accomplished by my invention.

To enable others skilled in the art to prepare my improved rubber, I will proceed to describe my process of so doing.

From numerous experiments, I find the following to be the most satisfactory. I take of the American Hard Rubber Company's red one part, and of the English pink five parts; roll each of these until they are of the same-sized sheets; then place one upon the other and roll the two until they adhere perfectly one to the other, employing warm rolls for this purpose, or otherwise warming the rubber; then fold the sheet thus rolled, and again pass it through the rolls. Continue so to do until the two tints are properly mingled, which is when the surface presents the proper striated appearance.

By thus combining the red with the pink, I add very much to the strength and durability of the production, owing to the difference in the compound.

Another process which I do not esteem as good, is done by taking like proportions and cutting each into shreds, and mixing the shreds thus cut. Then roll the mass into sheets as before.

I have described the two rubbers used as "American red" and "English pink," yet I do not wish to be understood as confining myself to these two rubbers as the precise tints, neither do I confine myself to the exact proportions here mentioned, but simply that I find these tints and the proportions here stated to produce the most satisfactory result. American white with American red, or white with the pink, will produce a result approaching the perfection which I have attained, as before described.

Having, therefore, thus fully described my invention, what I claim as new and useful, and desire to secure by Letters Patent, is—

Preparing rubber for dental purposes, substantially in the manner as herein set forth.

ISAAC WOOLWORTH.

Witnesses:
JOHN E. EARLE,
RUFUS H. SANFORD.